Feb. 8, 1966  M. BRINDLE  3,233,935
PORTABLE BUILDING
Filed April 26, 1963  3 Sheets-Sheet 1

INVENTOR
Melbourne Brindle

BY
ATTORNEYS

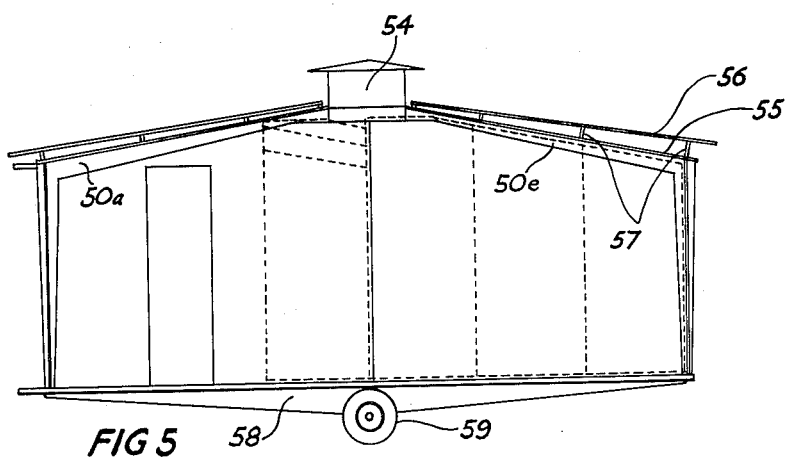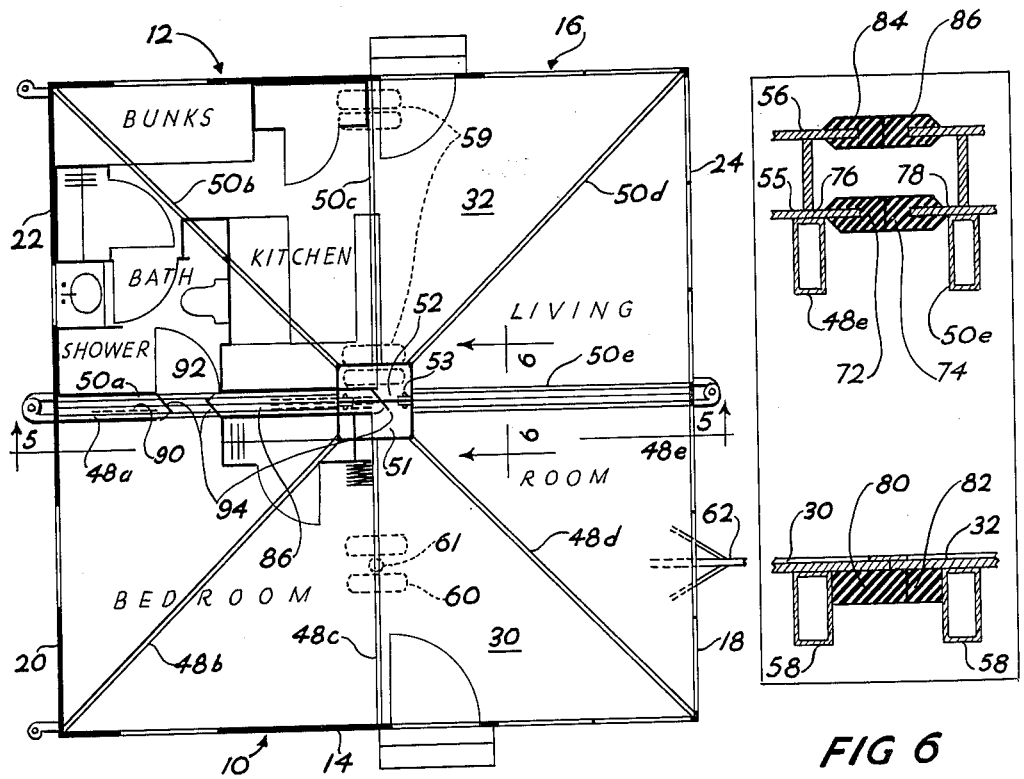

United States Patent Office 3,233,935
Patented Feb. 8, 1966

3,233,935
PORTABLE BUILDING
Melbourne Brindle, Bridgewater, Conn.
Filed Apr. 26, 1963, Ser. No. 276,003
4 Claims. (Cl. 296—23)

This invention relates to portable buildings and more particularly it concerns mobile dwellings of the type convertible to or from an arrangement in which they are adapted to be occupied and an arrangement in which they are most expeditiously transported.

With the advent of trailer parks and other public facilities accommodating the use of portable buildings or dwellings, such dwellings, particularly those of the type known as trailer homes or house trailers, have become increasingly popular because of the comfort with which a family may live in such a trailer home and yet enjoy the convenience of transporting the home from place to place as the owner's occupation may require or for other purposes such as camping, vacations and the like. Accordingly, the industry has responded by making every effort to overcome the basic problem of providing adequate living space in trailer homes, for example, while at the same time keeping the external size of the structure within preestablished limits dictated both by practical considerations in the sense that existing transportation facilities can accommodate only limited sized objects and as well, because of the statutory regulations which have been adapted by most jurisdictions. More specifically, current regulations in most jurisdictions limit the width of a house trailer to 10 feet while it is being transported on the highway. Further, the height of the trailer during transportation is restricted by underpasses to be encountered along most highways so that multi-story structures are not practical. As a result of these restrictions, designers and manufacturers of portable dwellings such as house trailers have been forced to use increased length as the basic mode of providing the additional living capacity desired. Although increasing the length of the dwelling provides additional living space while at the same time permitting the use of existing transportation facilities, the living comfort offered by an exceedingly long dwelling structure is limited to say nothing of the unattractive exterior appearance presented by such a structure.

To some extent the objectional characteristics of the exceedingly long trailer homes presently available on the market have been met by incorporating extensible or collapsible additions to portable dwellings of this type. Such additions are commonly in the form of a slidable or pivotal structure which may be extended during occupancy of the dwelling as a home and contracted within the major structure during transportation. In other instances, the dwelling is provided with collapsible portions which are designed to be quickly assembled for occupancy and disassembled to be mounted within the main dwelling structure during transportation. Such arrangements, however, are only a partial solution to the basic problem first because of the inconvenience presented in effecting the conversion between the occupied arrangement and the compacted transporting arrangement and secondly, because the removal of the added portion and storage thereof within the major portion of the dwelling during transport requires a complete revision of the interior furnishings of the dwelling. Moreover, the external appearance of these dwellings in most instances is dictated solely by functional requirements of the type mentioned above.

As a result, the overall picture presented by a trailer camp or public facilities at which such dwellings are located during occupancy is so unattractive that most existing communities are reluctant to permit the construction of portable dwelling facilities except only in undesirable zones.

Accordingly, a principal object of the present invention is to provide a portable building or dwelling by which the problems heretofore encountered are effectively and substantially overcome.

Another object of this invention is to provide a mobile dwelling which may be arranged as an extremely comfortable and attractive home during occupancy and yet which is simply converted for transport on existing facilities and without violating existing statutory requirements.

A further object of this invention is the provision of a mobile dwelling of the type referred to which is convertible between an arrangement for occupancy and an arrangement for transport without requiring any substantial moving or revision of furnishings on the interior of the dwelling used during occupancy.

Still another object of the present invention is to provide a mobile dwelling of the type referred to which during occupancy, enables living accommodations comparable to a conventional home both from the standpoint of interior arrangement and exterior appearance.

A still further object of this invention is to provide a mobile home of the type referred to which is convertible to a vehicular arrangement for transport for towing by a tractor vehicle on a highway without exceeding practical or statutory restrictions and without imposing an excessive load on the towing vehicle.

Still other objects and further scope of applicability of the present invention will become apparent from the attached drawings illustrating a preferred form of the present invention and in which:

FIG. 4 is a plan view of the dwelling arranged for occupancy with the roof removed;

FIG. 5 is a cross-section taken along line 5—5 of FIG. 4;

FIG. 6 is an enlarged fragmentary cross-section taken along line 6—6 of FIG. 4.

In general, the above-mentioned objectives are accomplished by arranging a pair of structural units in such a manner that they may be juxtajosed or placed one against the other in side by side relation when the dwelling is to be occupied and which may be arranged in tandem during transport. To facilitate such an arrangement, each of the units is provided with a complementing exterior face and the units hinged adjacent one end of the complementing faces so that when the units are brought together in juxtaposition, the faces will also be juxtaposed to provide, at least in part, a common interior wall in the dwelling during occupancy. Preferably, though not necessarily, the complementing faces are formed of removable partions, at least in part, so facilitate easy adaptation to comfortable living conditions in the dwelling, arrangement being made for stowage of the partitions between the faces forming the common interior wall of the dwelling. The partitions may be provided with appropriate doorways and the like depending on the interior room arrangement desired. Also, to facilitate transporting the dwelling one of the sections is provided with an undercarriage including a wheel and axle assembly. If desired, the other section to which a drawbar is affixed for towing, may be provided with a swivel wheel to facilitate handling of the two sections during conversion between the occupied and transport ararngements and as well, to support the forwardmost of the tandem sections during transporting.

Figure 1:
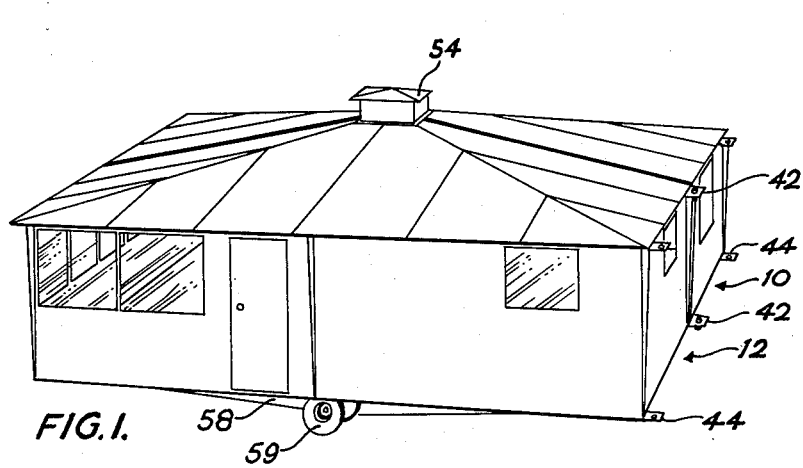
FIG. 1 is a perspective view of the portable building of the present invention arranged for occupancy.
Figure 2:
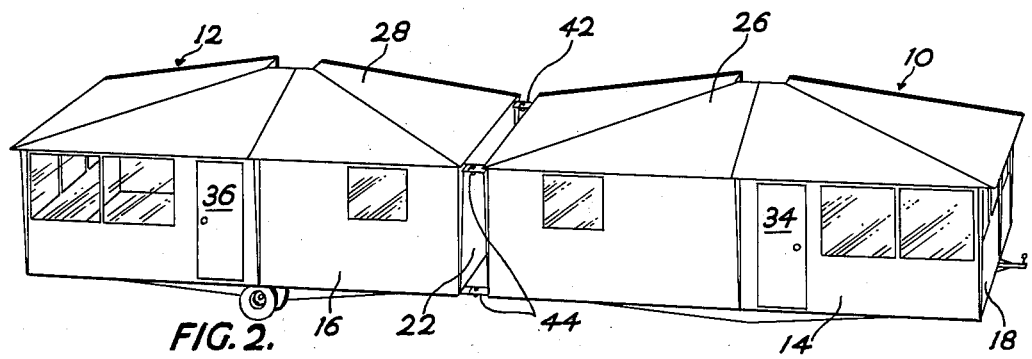
FIG. 2 is a perspective view illustrating one side of the dwelling illustrated in FIG. 1 arranged for transport.
Figure 3:
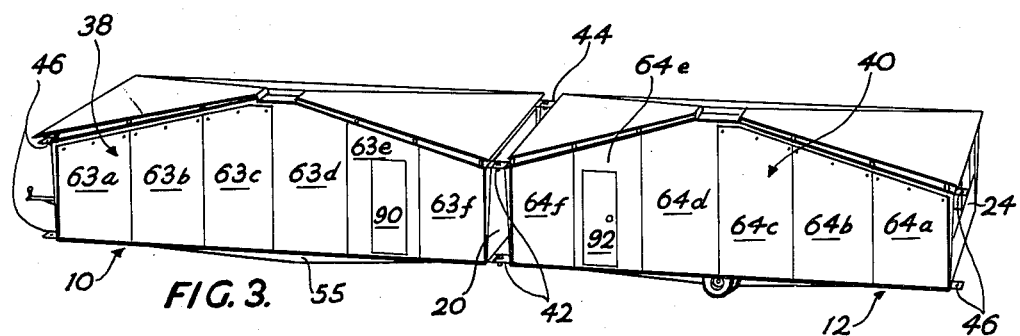
FIG. 3 is a perspective view similar to FIG. 2 but illustrating the opposite side of the dwelling from that illustrated in FIG. 2.

Referring now to the drawings and particularly to FIGS. 1–3 thereof, the general organization of one form of the present invention is shown to include first and second structural units designated generally by the reference numerals 10 and 12 respectively. In the embodiment illustrated, each of the units forms substantially one-half of the dwelling arranged for occupancy as shown in FIG. 1. Accordingly, each unit includes a complete exterior side wall 14, 16, and end wall halves 18, 20, 22 and 24 respectively. Also, each of the units is provided with a longitudinal half 26, 28 of a hip roof to be described in more detail hereinafter and a longitudinal floor half 30, 32 (FIG. 4). The external walls of the units 10 and 12 may be provided with appropriate building accessories. For example, the side wall 14 may be provided with an exterior door 34 while the external wall 16 in the unit 12 may also be equipped with an exterior door 36. Further, any suitable window arrangement may be provided in any of the walls 18, 20, 22 or 24 as may be desired.

The enclosure defined by each of the units 10 and 12 is completed by faces 38 and 40 respectively, which faces complement each other and are juxtaposed in the dwelling when arranged for occupancy to form at least in part, a common interior wall. For this purpose, the units are pivotally interconnected about a vertical axis at adjacent ends of the faces 38 and 40 by hinges 42. To secure or lock the units in tandem for transport in the arrangement shown in FIGS. 2 and 3, clevis locks 44 are provided on the wall halves 20 and 22 opposite the side at which the hinges 42 are located. Similar locks 46 are provided at the opposite ends of the faces 38 and 40 to secure the units in a folded position such as shown in FIG. 1. The hinges 42, locks 44 and locks 46 may be of any suitable conventional type that will permit the units to be pivoted one against the other in the manner described and as well, to be firmly secured in either the transport arrangement of FIGS. 2 and 3 or the occupied arrangement of FIG. 1.

A more detiled understanding of the units 10 and 12 and the manner in which they are converted from the occupied arrangement of FIG. 1 to the transport arrangement of FIGS. 2 and 3 and vice versa will be had by references to FIGS. 4–7 in conjunction with FIG. 3. As shown most clearly in FIGS. 4 and 5, the superstructure of each of the units 10 and 12 includes a plurality of boomerang-shaped struts 48a–e and 50a–e respectively. The struts are arranged in such a manner that the roof halves 26 and 28, in the occupied arrangement, form a completed hip roof. Hence, the struts 48b, 48d, 50b and 50d extend upwardly along each outside corner of the units 10 and 12 and converge centrally at the upper edge of the faces 38 and 40 by connection to a cap formed in halves 51 and 52. Adequate roof support transversely of the units 10 and 12 is afforded in the embodiment shown by single struts 48c and 50c extending centrally of the exterior sidewalls 14 and 16 and similarly connected at their upper ends to the cap halves 51 and 52. To provide necessary roof support both during the occupied arrangement and the transport arrangement, the struts 48a, 48d, 50a and 50d extend about the faces 38 and 40. As will be appreciated by those skilled in the art, the struts may be affixed at their upper ends to the cap halves 51 and 52 in any suitable manner such as by welding. Also, the cap halves are adapted to be secured in the occupied arrangement such as by bolts 53. It is preferred that the cap formed by the halves 51 and 52 be shaped to provide a pan-like structure which may, if desired, be used to support an air conditioner unit 54 as shown in FIGS. 1 and 5, or to support a chimney (not shown). Moreover, the cap may be suitably formed to receive various utility connections such as for example, a furnace flue if desired.

The roof halves 26 and 28 are identical and each includes an interior sheet 55 layed and secured directly on the boomerang struts 48a–e and 50a–e. The sheet 55 may be of any suitable material and if desired, may be finished on its under side to provide a finished ceiling on the interior of each of the units. Also, each of the roof halves preferably includes an exterior sheet or fly 56 supported in spaced relation to the sheet 55 by spreader struts 57. This arrangement permits circulation of air between the sheet 55 and the fly 56 to aid in cooling the dwelling during the summer season. In addition, the fly enhances the appearance of the roof.

The substructure or undercarriage of both units 10 and 12 is the same to the extent that each includes a plurality of floor joists 58 extending longitudinally and properly spaced to provide adequate support. The undercarriage of the unit 12 includes a pair of wheels 59 spaced on an axle (not shown) which in turn supports the floor joists 58 in conventional fashion. As will be appreciated, although a single axle wheel arrangement is illustrated, tandem wheels could be employed without in any way departing from the present invention. The undercarriage of the unit 10 is preferably equipped with a pair of closely spaced wheels 60 pivotally connected by suitable means (not shown) to effect a swivel action about a vertical axis 61. In the embodiment shown, the wheels 60 on the unit 10 and the wheels 59 on the unit 12 are disposed centrally of the length of the units so that in the occupied arrangement all of the wheels are aligned on a common axis. In this manner, the units may be simply shored up at their ends when occupied. Also, it will be understood that because the wheels 60 are mounted through a swivel to the unit 10, the conversion of the units from the occupied to the transport arrangement or vice versa is greatly facilitated. A drawbar 62 is provided on the end 18 of the unit 10 opposite from the end at which it is connected to the unit 12 for towing the units in tandem as shown in FIGS. 2 and 3.

Figure 7:
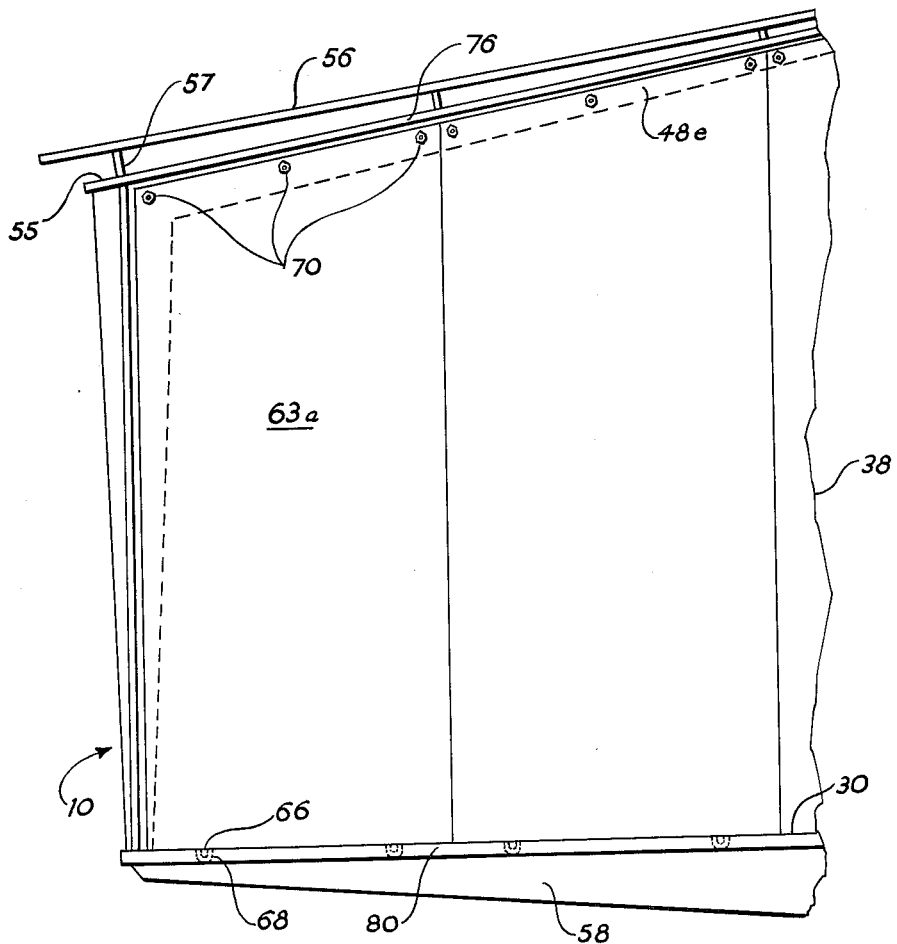
FIG. 7 is an enlarged fragmentary side view illustrating a portion of the side of the dwelling as shown in FIG. 3.

The faces 38 and 40 on the units 10 and 12 are adapted to receive a plurality of removable panel sections 63a–f and 64a–f respectively. As shown in FIG. 7, each of the panels is secured in place along their bottom edge by lugs 66 receivable in apertures 68 in the floor sections 30 and 32. At their upper ends they are secured to the laterally projecting arms of the boomerang struts 48a, 48e, 50a and 50e by suitable means such as bolts 70.

To effectively seal the units 10 and 12 together in the folded or occupied arrangement of FIG. 1, the outer peripheries of the faces 38 and 40 are equipped with complementing sealing gaskets 72 and 74 along a projecting edge 76, 78 of the roof and end walls. A similar pair of sealing gaskets 80 and 82 are provided along edges in the floor sections 30 and 32 respectively. Also, gasket strips 84 and 86 are mounted along the edges of the fly-roof presented along each of the faces 38 and 40. Because of the projecting portions such as 76 and 78 about the entire periphery of each of the faces 38 and 40, a space 86 is left between the faces when the units are folded to achieve the occupied arrangement of FIGS. 1 and 4. The space is very effectively utilized particularly where the interior arrangement of the dwelling calls for an uninterrupted opening between the two sections 10 and 12 when folded. Hence, as will be understood by reference to FIGS. 3 and 4 of the drawings, the panels 63a–c and 64a–c are removed upon folding the units to achieve the occupied arrangement and stowed in the chamber 86. In this instance, the panels 63d–f and 64d–f are left in place to form a common wall over at least part of the faces 38 and 40 in the occupied dwelling or in the embodiment shown, between the master-bedroom and the bathroom and kitchen units. Further, it will be noted that the panels 63e and 64e are respectively provided with interior door members 90 and 92. As shown in FIG. 4 the door member 90 is folded or stowed into the space 86 whereas the door member 92 functions as an interior door between the units 10 and 12. Also, hinged metal plates 94 may be provided to close off the space 86 around the opening in which the door 92 is mounted.

In use, the units 10 and 12 are arranged in tandem with the locks 44 engaged to be transported by a towing vehicle (not shown) to which the drawbar 62 is connected. In this arrangement, the air conditioning unit 54 is removed and stowed within either one of the units and also, each of the panels 63a–f and 64a–f is bolted in place so that the items normally used within the dwelling are completely protected from the weather during transport. Also, it will be noted that because of the swivel wheel 60 on the undercarriage of the unit 10, the combined dwelling during transport is afforded a tricycle type running gear with the forwardmost wheel swiveled to provide for steerage. While it is desirable to support the forwardmost unit (in this instance the unit 10) so that at least a portion of the load is removed from the drawbar and thus the towing vehicle, it may be desirable in certain applications to arrange the wheels 60 to be retracted during towing. Although such means is not illustrated in the drawings it will be appreciated that a retractable running gear of any conventional well-known variety might be used in this manner.

When it is desired to convert the dwelling to an arrangement for occupancy such as at a trailer park or the like, the panels 63a–c and 64a–c in the embodiment shown are removed by disengaging the bolts 70 and lifting the panels so that the lugs 66 are removed from the apertures 68. Also at this time the door 90 in the panel 63a is swung outwardly against the outer face of the panel 63f. Then, the clevis locks 44 are released and the front unit 10 swung about the axis of hinges 42 until the faces 38 and 40 are brought into juxtaposition and the gasket members 76, 80 and 84 are brought into firm abutting engagement with the gaskets 78, 82 and 84 respectively. The locks 46 are then engaged to retain the units in the juxtaposed or occupied arrangement, shown for example, in FIG. 4. After the bolts 53 have been tightened in place to secure the cap halves 51 and 52, the removed panels 63a–c and 64a–c are inserted into the space 86 as shown in FIGS. 3 and 4 of the drawings. Also, the hinged metal plates 94 will be engaged to cover the opening between the faces 38 about the doorway leading from the bedroom to the bathroom in the embodiment shown. Thereafter, a chimney or the air conditioning unit 54 may be seated in place.

Thus it will be seen that by this invention an extremely effective portable building or dwelling is provided by which the above-mentioned objectives are completely fulfilled. Not only does the present invention afford a dwelling of the trailer home type with living accommodations comparable to more permanent type structures, but also it enables conversion to an arrangement for transporting in an extremely efficient and uncomplicated manner. It will be appreciated that a number of variations of the embodiment described above and illustrated on the attached drawing are possible without departing from the present invention. It is to be distinctly understood, therefore, that the described embodiment is illustrative only, not limiting, and that the true spirit and scope of the present invention is to be determined by reference to the appended claims.

The invention claimed is:

1. A portable building comprising: a first structural unit to form substantially one half of the building and having an exterior face along one side thereof, a second structural unit to form substantially the other half of the building and having an exterior face along one side thereof and complementing said exterior face along said one side of said first unit, each of said faces including a plurality of adjacent removable panels to provide a closed wall therealong, said panels extending from the top to the bottom of said faces to present an unobstructed opening in said wall when removed, and at least one of said faces including a peripheral extension projecting laterally beyond said panels, said peripheral extension having a gasket means on the extending edge thereof to provide a sealed joint between said units and defining a vertically disposed chamber between the panels of said units when said faces thereof are brought together in juxtaposition, whereby selected ones of said panels may be removed to establish an opening between said units and stored in the chamber defined by said peripheral extension and others of said panels left in place.

2. A mobile dwelling convertible between occupied and transportable arrangements, said dwelling comprising: a first structural unit to form substantially one half of the dwelling and having an exterior face along one side thereof, a second structural unit to form substantially the other half of the dwelling and having an exterior face along one side thereof and complementing the exterior face along the one side of said first unit, each of said faces including a plurality of adjacent panels to provide a closed wall therealong, some of said panels being removable to provide an opening between said units when said faces thereof are brought together in juxtaposition to establish the occupied arrangement, and a peripheral extension projecting laterally beyond said panels, said peripheral extension defining a vertically disposed chamber between the panels of said structural units remaining in place when said faces thereof are brought together in juxtaposition to provide for storage of the panels removed, and undercarriage means for supporting said second unit, hinge means connecting said first and second units along a substantially vertical axis and adjacent ends of said faces, lock means for securing said units in tandem, and towing means at the end of said first unit opposite from the end at which said hinge means is located whereby said first and second units may be folded one against the other for the occupied arrangement and extended to form the transportable arrangement in which said units may be towed in tandem.

3. A mobile dwelling convertible between occupied and transportable arrangements, said dwelling comprising: a first structural unit to form substantially one half of the dwelling and having an exterior face along one side thereof, a second structural unit to form substantially the other half of the dwelling and having an exterior face along one side thereof and complementing the exterior face along the one side of said first unit, each of said units including a superstructure defined by a plurality of boomerang-shaped struts and complementing cap halves positioned centrally at the top of each of said faces, the upper ends of said struts being secured to said cap halves, wheeled undercarriage means for supporting said second unit, hinge means connecting said first and second units along a substantially vertical axis at adjacent ends of said faces, lock means for securing said units in tandem, and towing means at the end of said first unit opposite from the end at which said hinge means is located whereby said first and second units may be folded one against the other for the occupied arrangement and extended to form the transportable arrangement in which said units may be towed in tandem.

4. The apparatus recited in claim 3 in which said cap halves are arranged to be secured together to define a pan-shaped support for utility items.

References Cited by the Examiner
UNITED STATES PATENTS

| | | | |
|---|---|---|---|
| 1,156,693 | 10/1915 | Koger | 296—23 X |
| 2,743,784 | 5/1956 | Karlsson | 180—1 X |
| 2,893,066 | 7/1959 | Perdue | 296—23 X |
| 2,920,580 | 1/1960 | Williams | 104—29 |
| 3,068,534 | 12/1962 | Hu | 20—2 X |
| 3,157,427 | 11/1964 | Reynolds | 296—23 |

FOREIGN PATENTS

| | | |
|---|---|---|
| 525,958 | 9/1940 | Great Britain. |

References Cited by the Examiner
UNITED STATES PATENTS

| | | |
|---|---|---|
| 2,706,313 | 4/1955 | Radman. |
| 2,990,588 | 7/1961 | McKinley. |

BENJAMIN HERSH, *Primary Examiner.*
A. HARRY LEVY, *Examiner.*